May 21, 1957 F. C. SCHWANEKE 2,793,011
PORTABLE FOOD MIXER
Original Filed April 3, 1952 2 Sheets-Sheet 1
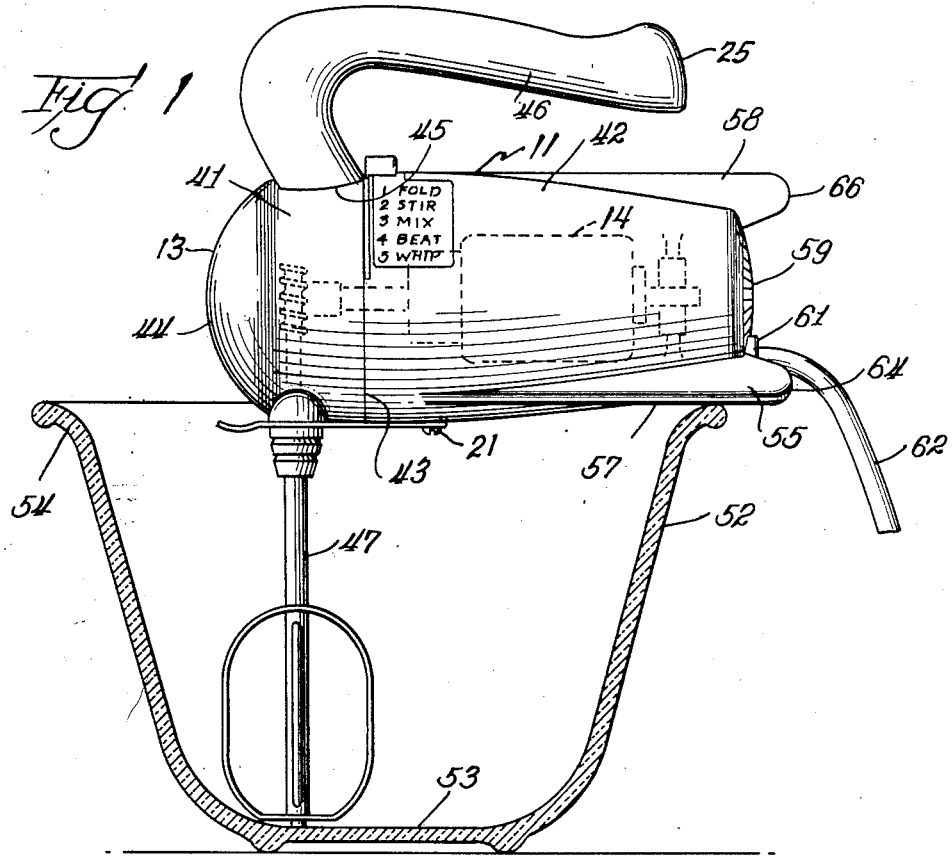
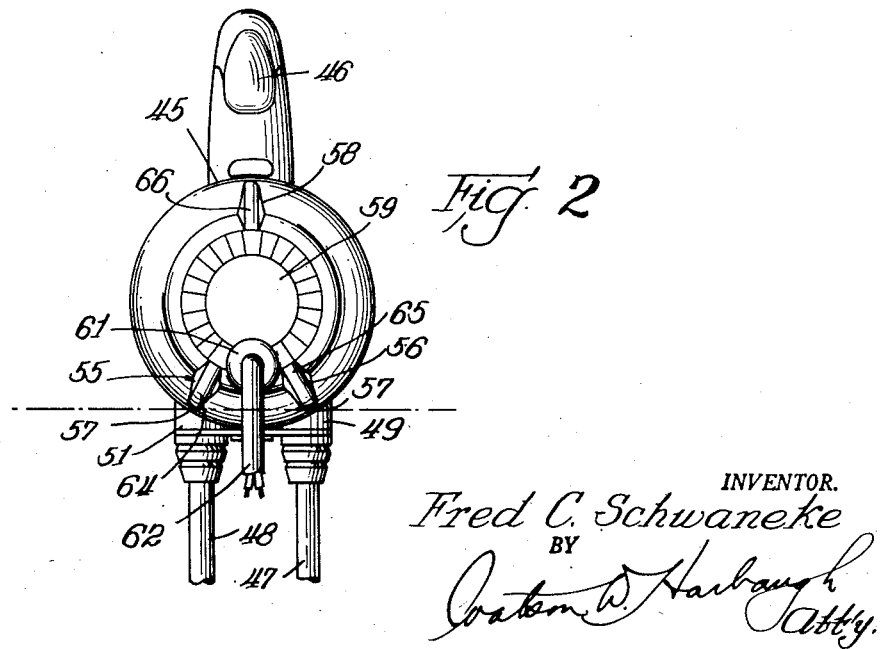
INVENTOR.
Fred C. Schwaneke
BY May 21, 1957 F. C. SCHWANEKE 2,793,011
PORTABLE FOOD MIXER
Original Filed April 3, 1952 2 Sheets-Sheet 2

INVENTOR.
Fred C. Schwaneke
BY
Watson D. Harbaugh
Atty.

United States Patent Office 2,793,011
Patented May 21, 1957

2,793,011

PORTABLE FOOD MIXER

Fred C. Schwaneke, Chicago, Ill., assignor to Dormeyer Corporation, Chicago, Ill., a corporation of Illinois Original application April 3, 1952, Serial No. 280,221, now Patent No. 2,692,126, dated October 19, 1954. Divided and this application April 21, 1954, Serial No. 424,540

7 Claims. (Cl. 259—104)

The present invention relates to portable food mixers and concerns itself more particularly with devices of this class which utilize an electrically driven motor contained in a tubular casing from which there extend perpendicularly a pair of beater spindles. This application is a division of my earlier application, Serial No. 280,221, now Patent No. 2,692,126, granted October 19, 1954.

A principal object of the invention is to provide an electric motor driven food mixer wherein the motor and transmission are completely encased in a single protective housing and which utilizes a pair of beater spindles disposed perpendicular to the principal axis of the protective housing together with simple and ruggedly constructed support structure upon which the casing may be stably balanced in an upright position with the beater spindles extended.

Another object of the present invention is to provide a manually portable food mixer apparatus with a motor and power transmission system contained within a generally tubular enclosure having agitator or beater spindles projecting in a direction generally perpendicular to the principal axis of the casing and with a support structure aesthetically and functionally compatible with the utility features of the appliance.

A still further object of the present invention is to provide a manually portable food mixer with electric power motor and transmission apparatus contained within a substantially cylindrical casing, in which the power supply cord for the motor passes through a rear wall of the casing and with a tilt-back system of supporting legs extending rearwardly of the casing whereby the mixer may be placed out of hand in an erect position while permitting the cable sufficient intervening clearance to be flexed sidewardly without interference to the stability of said mixer thus disposed.

Additional objects of the present invention are such as will appear during the course of the following explanation of the various features and operation, in conjunction with the accompanying drawings wherein:

Fig. 1 is a side elevational view of one embodiment of food mixer incorporating various features and advantages of the present invention and illustrated in connection with a mixing bowl in its utility position with its beater spindles inserted into the cavity of a mixing bowl illustrated sectionally;

Fig. 2 is a rear elevation view of the mixer apparatus with portions broken away featuring the construction illustrated in Fig. 1;

Figure 3:
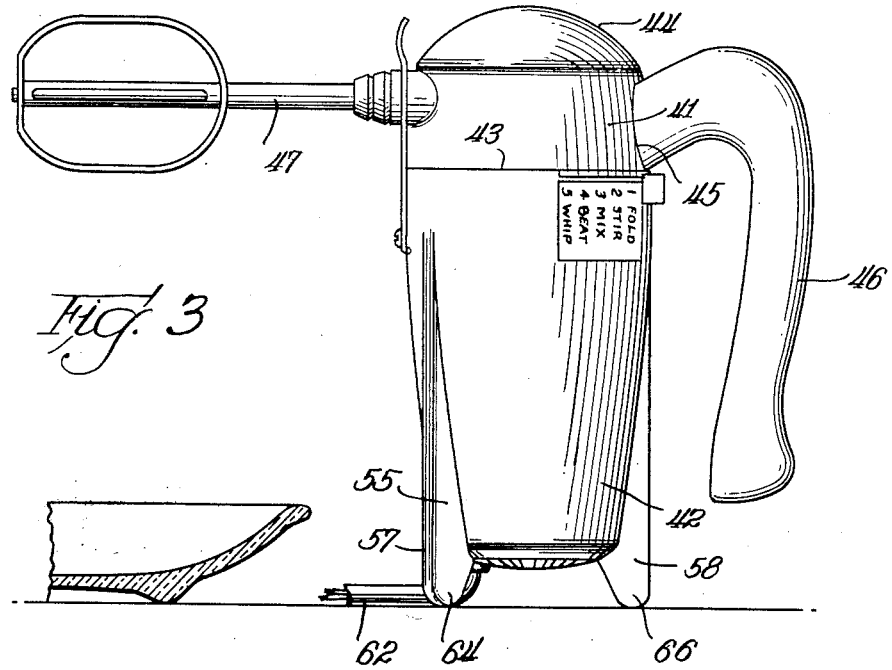
Fig. 3 is a side elevational view of the apparatus illustrated in Figs. 1 and 2 shown in its poised or up-ended condition.

A fundamental concept of this invention is that of a portable food mixer with a motor and transmission mechanism contained within a substantially cylindrical, but slightly barrel-shaped casing or enclosure housing having transversely partitioned closure walls at front and rear. Near its front end, and extending perpendicularly to the principal housing axis, the mixer is provided with a pair of removable interdigitating beaters carried upon parallelly extending spindles. At the rear of the housing and preferably in diametric opposition to the spindles the casing is provided with a manually engageable handle, the principal portion of which lies substantially longitudinal to the main axis of the housing. The handle is of adequate proportions to be gripped with a single hand and to enable the mixer to be maneuvered by means of simple and minor wrist movements between utility and rest positions.

The invention has been illustrated in the drawings in terms of one of the embodiments, the construction and operation of which will be taken up during the course of the following detailed specification. Like reference numerals have been employed to designate corresponding parts throughout.

Figure 4:
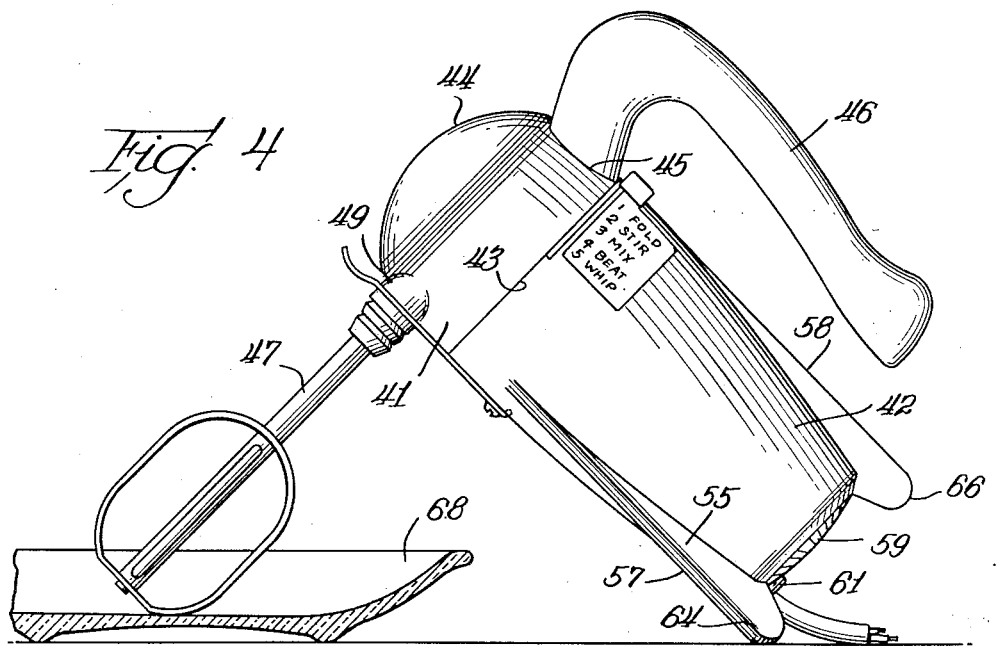
Fig. 4 is a side elevational view of a mixer apparatus according to the construction featured in Figs. 1 through 3 disposed in a forward leaning position with its weight partially resting on its beater spindles.

Directing attention now to the embodiment as shown in Figs. 1 through 4, a substantially cylindrical housing member 11 will be observed to converge more pronouncedly in a rearward direction whereat it terminates with a relatively shallow convex end wall 59, Fig. 4. This member 11 converges correspondingly in the opposite direction but to a lesser degree, terminating thereat with a relatively more protuberant convex front wall 13.

In accordance with conventional manufacturing practice, the casing 11 is constructed of two principal casing portions or cup elements 41 and 42, which butt each other at the parting line 43, affording access to their hollow interiors. The forward cup or casing element 41 is provided with a rounded convex wall portion 44, and at one side thereof as designated at 45 there is secured to this portion of the casing a handle 46, which can be of the closed rear end type, but as shown here is of the open ended type having a projecting portion indicated at 25.

Within the interior of the larger casing portion 42 is contained an electric motor (shown in dotted outline 14, Fig. 1) while within the other portion 41 is a system of transmission gearing 15 driven by the motor for imparting synchronous but reverse rotary motion to two spindle chucks 49 and 50 which carry a pair of beater spindles 47 and 48 with interdigitating paddles 29 optionally removable through the manipulation of a springable release member 19 anchored to the housing as at 21.

As mentioned, the transmission gearing is contained inside of the forward casing element 41 so that the beater spindles 47 and 48 extend perpendicularly thereof and it will be noted that the handle is disposed diametrically opposite thereto. In conjunction with this embodiment of a food mixer a suitable proportioned mixing bowl 52 is used which is such that when the beater spindles 47 and 48 are disposed therewithin after the manner illustrated in Fig. 1, the extremites of the spindle shafts will rest on the interior surface 53 of the bottom of the bowl while the mixer casing comprised of the elements 41 and 42 is supported horizontally after the manner shown.

Of paramount significance in this connection is that the lip or flange 54 of the bowl under such circumstances is adapted to give sliding support to a pair of radial fin formations 55 and 56, see also Fig. 2, whose outermost edges 57 are designed to function as runners or skids being parallel to each other and resting upon the rounded lip or flange 54 of bowl 52.

Although the casing element 42 is for aesthetic and convenience reasons, preferably tapering towards the rearmost extremity of the mixer unit the shape of the fin elements 55 and 56 with respect thereto is but slightly protuberant as a result of which the mixer apparatus when disposed after the manner shown in Fig. 1 in relationship to a proper or suitable depth of mixing bowl 52, permits the beater spindle extremities 47 and 48 to glide upon the interior surface area of the mixing bowl smoothly.

From Fig. 2 it may be observed that the two radial fins 55 and 56 are preferably located at a small angular displacement from and symmetrically on both sides of a vertical plane passing midway between the beater spindles 47 and 48 and that a third such fin designated 58 is formed on the surface of case element 42 along an element diametrically opposite the described fins 55 and 56, it being also noted that if the third fin is omitted, the rear end 25 of the handle is diametrically opposite.

The rear wall 59 as characterized by a shallow convexity is apertured so as to receive an insulation grommet 61 through which the cable 62 is admitted connecting an external source of current supply to the within-contained electric motor. Because of the aforedescribed mobility of the food mixer on its runner fins 55 and 56, locating the current supply cable 62 so that it will not interfere with this mobility presents a problem of conflict with the tilt-back feature. The cable is required to be out of range of physical interference with the food mixer so that it can glide upon the end bearing support of its spindles 47 and 48 as the skids 57 glide over the edge of the bowl lip formation 54.

Ideal operating conditions require that the space within the bowl 52 permits the interdigitating beater paddles 29 and their shafts 47 and 48 to move about horizontally with the weight of the casing and its contained electric motor and transmission system distributed between said shafts and the runner edges 57 of the fins 55 and 56.

By making each one of the fins 55, 56 and 58 of identical contour, the versatility of this type of mixer may be extended to include a stable tilt-back support as best indicated in Fig. 3. Here the center of gravity may be considered as substantially coincident with the center of the mass, which is maintained between the three leg points 64, 65 and 66. These points are, in fact, aesthetic continuations of the fin structures 55, 56 and 58, respectively. In this form the length of the rearward extension is somewhat greater than extensions 35 in the preferred embodiment in order to provide adequate clearance for the cord or cable 62 after the manner designated in Fig. 3.

The weight of the handle 46 on one side of the casing tends to balance the combined weight of the two beater spindles 47 and 48. The gently resilient effect which is contributed by the turned under portion of cable 62 lying beneath the spindles 47 and 48 tends to resolve stability against any overbalancing effects which may be produced by the weight of clinging batter.

Because of placement of the two adjacent fins 55 and 56 in the manner designated in Fig. 2, with the leg portions 64 and 65 extending rearwardly as they do, the apparatus may also be tipped forward and supported after the manner indicated in Fig. 4. In this way, weight of the appliance is even more stably balanced over a wider spread of support points. Drippings from the beater paddles may be advantageously caught in a shallow vessel or dish such as the one designated 68 from which such drippings can be restored to the original batter. Also, if the fin 66 is omitted the handle 46 will serve as a third point of suspension with the unit tilted rearwardly as shown in said application.

While the present invention has been explained and described with reference to a specifically contemplated embodiment of structure, it is to be understood, nevertheless, that numerous modifications and variations are susceptible of being incorporated without departure from the essential spirit or scope thereof. Accordingly, it is not intended for an understanding of this invention to be limited to the illustrations is the annexed drawings or to the language employed in the foregoing specification except as indicated in the hereunto appended claims.

What is claimed is:

1. In combination with a mixing bowl, a portable food mixer, comprising an electric power motor, a transmission driven by said motor, a pair of depending rotary chuck members parallelly disposed and synchronously driven by said transmission, a casing for housing said motor and said transmission having a substantially cylindrical portion blending into a gradually tapering convergence, a truncated end to said convergence having a convexly protuberant end wall, the longitudinal axis of said casing being substantially perpendicular to a plane in which lie the axes of said chuck members, a pair of beater spindles extending from said chuck members, and means for supporting said casing in level shiftable position upon the lip flange of said mixing bowl when said beater spindles are inserted into said bowl with their remote ends riding on the bottom thereof which comprises a pair of identical fin-like flukes extending radially of said casing axis equiangularly spaced from a plane passing midway between said chuck members and having longitudinal edges substantially parallel with said casing axis and lying in a plane passing below the contour of the rear end of the casing.

2. The combination set forth in claim 1 in which said flukes have outermost edges parallel to each other whereby to serve as skids for riding the flange of said mixing bowl.

3. In a portable food mixer, a casing for housing the motor and transmission of a mixer unit having a substantially cylindrical portion with tapering convergences toward the ends thereof, a set of chuck members extending near one end of said casing, a pair of twin beater spindles extending from said chuck members, and dual purpose means for supporting said casing horizontally upon the lip flange of a mixing bowl when said beater spindles are inserted into said bowl as well as to prop said unit on end during rest with the beaters inclined to rest in a saucer, which comprises a plurality of fin-like projections extending radially of said casing, two of which are angularly spaced from a plane passing midway between said chuck members, having longitudinal edges serving as skids below the level of the casing at the rear end thereof and substantially parallel with said casing axis, and having rearward extensions serving as legs of a balancing support to said unit said mixer having an electric cord at the rear end thereof for free left or right handed operation of said mixer.

4. In a portable food mixer, an elongated casing for housing the motor and transmission of a mixer unit having an electric cord at the rear end thereof, a set of chuck members extending near one end of said casing, a pair of twin beater spindles extending from said chuck members at the front end thereof, an extension cord leading axially rearwardly from the rear end of casing, and dual purpose means for supporting said casing horizontally upon the lip flange of a mixing bowl when said beater spindles are inserted into said bowl as well as to prop said unit on end during rest, which comprises a pair of finlike projections extending radially of said casing, each angularly spaced from a plane passing midway between said chuck members, having longitudinal edges serving as skids below the casing at the rear end thereof and substantially parallel with said casing axis, and having rearward extensions serving as legs of a balancing support to said unit extending beyond said rear end of the casing.

5. The combination called for in claim 4 including means carried by the casing diametrically opposite said pair of projections for providing in combination with said pair of projections a third point of support during rest of said mixer.

6. In a portable food mixer, an elongated casing for housing the motor and transmission of a mixer unit, a set of chuck members extending near one end of said casing, a pair of twin beater spindles extending from said chuck members, and dual purpose means for supporting said casing horizontally upon the lip flange of a mixing bowl when said beater spindles are inserted into said bowl as well as to prop said unit on end during rest, which comprises a plurality of elements including a pair of finlike projections extending radially of said casing along the bottom portion, each angularly spaced from a plane passing midway between said chuck members, and a finlike projection on top of the casing, said pair of projections having longitudinal edges serving as skids below the casing at the rear end thereof and substantially parallel with said casing axis, and all of said projections having rearward extensions serving as legs of a balancing support to said unit said unit having an electric cord at the rear end thereof whereby interference with the operation of the unit is precluded.

7. In a portable food mixer, a casing containing an electric motor in the rear portion and a transmission in the front portion thereof driven by the electric motor including a pair of beater drive spindles opening downwardly below said transmission to receive the shafts of beaters therein having interdigitating blades rotatable upon axes located substantially perpendicular to the axis of said motor, means detachably interconnecting said spindles and shafts in drive engagements, and means for supporting said mixer on the rear end of the casing in upended position with the axis of said motor disposed vertically and with said beaters disposed in a generally horizontal position with some of the blades disposed below the shafts to drain food mixtures thereon back into a vessel disposed under said beaters, the last said means comprising a plurality of appendages extending radially along the sides of the casing spaced from each other at the rear end of the casing and blending into the contour thereof, two of said appendages being located equidistant from a plane passing between said spindles and through said motor axis, said appendages having portions which extend in an axial direction laterally and axially beyond the end of the casing, other of said appendages being disposed in radially spaced relation to said two appendages and extending rearwardly to constitute with said two appendages a footing for the casing and beaters at a plurality of spaced points in excess of two with the center of gravity of said food mixer disposed within a vertical projection of said footing to locate the beaters and support the casing in said position while the beaters are being drained and removed, said mixer having an electric cord at the rear end thereof, said appendages having a predetermined length beyond said casing to prevent said cord from interfering with said footing in use.

References Cited in the file of this patent

UNITED STATES PATENTS

| | | |
|---|---|---|
| 1,862,826 | Mross | June 14, 1932 |
| 1,911,202 | Nielsen | May 30, 1933 |
| 2,048,455 | Knapp | July 21, 1936 |
| 2,509,557 | Braatz | May 30, 1950 |
| 2,525,338 | Brown | Oct. 10, 1950 |
| 2,578,901 | Schmidt | Dec. 18, 1951 |
| 2,615,942 | Edman | Oct. 28, 1952 |

OTHER REFERENCES

McFarland abstract of application Ser. No. 201,897, published January 22, 1952, 654 O. G. 1155.